United States Patent
Choi et al.

(10) Patent No.: US 10,470,122 B2
(45) Date of Patent: Nov. 5, 2019

(54) EXTENDED PAGING DISCONTINUOUS RECEPTION (DRX) CYCLES IN WIRELESS COMMUNICATION NETWORKS

(71) Applicant: Intel IP Corporation, Santa Clara, CA (US)

(72) Inventors: Hyung-Nam Choi, Hamburg (DE); Sangeetha L. Bangolae, Beaverton, OR (US); Marta Martinez Tarradell, Hillsboro, OR (US); Puneet Jain, Hillsboro, OR (US); Ana Lucia Pinheiro, Portland, OR (US); Maruti Gupta Hyde, Portland, OR (US); Ali T. Koc, Portland, OR (US); Rath Vannithamby, Portland, OR (US); Satish Chandra Jha, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/730,313

(22) Filed: Oct. 11, 2017

(65) Prior Publication Data
US 2018/0098280 A1    Apr. 5, 2018

Related U.S. Application Data

(62) Division of application No. 14/779,024, filed as application No. PCT/US2013/077255 on Dec. 20, 2013, now Pat. No. 9,794,876.

(Continued)

(51) Int. Cl.
| | | |
|---|---|---|
| H04W 52/02 | (2009.01) | |
| H04W 76/28 | (2018.01) | |
| H04W 68/00 | (2009.01) | |

(52) U.S. Cl.
CPC ....... *H04W 52/0216* (2013.01); *H04W 76/28* (2018.02); *H04W 68/005* (2013.01);
(Continued)

(58) Field of Classification Search
CPC ... H04W 76/048; H04W 66/06; H04W 66/02; H04W 52/0216; H04W 72/0413
See application file for complete search history.

(56) References Cited

U.S. PATENT DOCUMENTS

| | | | |
|---|---|---|---|
| 9,794,876 B2 | 10/2017 | Choi et al. | |
| 2008/0186893 A1 | 8/2008 | Kolding et al. | |

(Continued)

FOREIGN PATENT DOCUMENTS

| | | |
|---|---|---|
| CN | 101473563 A | 7/2009 |
| CN | 102217408 A | 10/2011 |

(Continued)

OTHER PUBLICATIONS

"3rd Generation Partnership Project; Technical Specification Group Core Network and Terminals; Mobile radio interface Layer 3 specification; Core network protocols; Stage 3 (Release12)", 3GPP Standard; 3GPP TS 2 4 .0 0 8 , 3RD Generation Partnership Project (3GPP), Mobile Competence Centre ; 650, Route Deslucioles ; F-06921 Sophia-Antipolis Cedex; France,, (Dec. 19, 2012), 252 pgs.

(Continued)

*Primary Examiner* — Jamal Javaid
(74) *Attorney, Agent, or Firm* — Schwegman Lundberg & Woessner, P.A.

(57) ABSTRACT

Embodiments of wireless communication devices and method for discontinuous reception (DRX) mode in RRC_IDLE state of wireless communication are generally described herein. Some of these embodiments describe a wireless communication device having processing circuitry
(Continued)

arranged to determine to use an extended paging discontinuous reception (DRX) value to increase a paging cycle length. The wireless communication device may transmit a non-access stratum (NAS) message to the network, indicating that the wireless communication device desires to use the extended paging DRX value. The wireless communication device may receive a message from the network that includes an information element (IE) indicating whether the network supports the extended paging DRX value. Other methods and apparatuses are also described.

8 Claims, 6 Drawing Sheets

Related U.S. Application Data

(60) Provisional application No. 61/806,821, filed on Mar. 29, 2013, provisional application No. 61/808,597, filed on Apr. 4, 2013.

(52) U.S. Cl.
CPC .......... Y02D 70/00 (2018.01); Y02D 70/1224 (2018.01); Y02D 70/1242 (2018.01); Y02D 70/1262 (2018.01); Y02D 70/1264 (2018.01); Y02D 70/142 (2018.01); Y02D 70/146 (2018.01); Y02D 70/21 (2018.01); Y02D 70/24 (2018.01)

(56) References Cited

U.S. PATENT DOCUMENTS

| 2009/0040955 | A1 | 2/2009 | Jung et al. |
| 2010/0130237 | A1 | 5/2010 | Kitazoe et al. |
| 2011/0128865 | A1 | 6/2011 | Doppler et al. |
| 2012/0275365 | A1 | 11/2012 | Anderson et al. |
| 2012/0302230 | A1* | 11/2012 | Lim ...................... H04W 8/065 455/422.1 |
| 2013/0039287 | A1 | 2/2013 | Rayavarapu et al. |
| 2013/0170415 | A1* | 7/2013 | Fukuta .............. H04W 52/0216 370/311 |
| 2013/0301501 | A1 | 11/2013 | Olvera-Hernandez et al. |
| 2014/0161007 | A1 | 6/2014 | Donthi et al. |
| 2016/0057701 | A1 | 2/2016 | Choi et al. |

FOREIGN PATENT DOCUMENTS

| CN | 102917444 A | 2/2013 |
| CN | 105103634 B | 3/2019 |
| EP | 2979504 A1 | 2/2016 |
| EP | 2979504 B1 | 9/2018 |
| TW | I528851 B | 4/2016 |
| TW | 201640944 A | 11/2016 |
| TW | I590695 B | 7/2017 |
| TW | 201731331 A | 9/2017 |
| TW | I640212 B | 11/2018 |
| WO | WO-2012050841 A1 | 4/2012 |
| WO | WO-2012111993 A2 | 8/2012 |
| WO | WO-2013017006 A1 | 2/2013 |
| WO | WO-2014158268 A1 | 10/2014 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, figure 5.3.3.1-1., [Online]. Retrieved from the Internet: <http://www.3gpp.org/DynaReport/36331.htm>, (Mar. 18, 2013), 108, 129.

"3rd Generation Partnership Project; Technical Specification Group Services and System Aspects; Machine-Type and other Mobile Data Applications Communications Enhancements (Release12)", 3GPP Standard; 3GPP TR 2 3 .8 8 7 , 3RD Generation Partnership Project (3GPP), Mobile Competence Centre ; 650, Route Des Lucioles ; F-06921 Sophia-Antipolis Cedex; France, (Dec. 18, 2012), 90 pgs.
"U.S. Appl. No. 14/779,024, Non Final Office Action dated Dec. 23, 2016", 13 pgs.
"U.S. Appl. No. 14/779,024, Notice of Allowance dated Jun. 12, 2017", 6 pgs.
"U.S. Appl. No. 14/779,024, Response filed Apr. 24, 2017 to Non Final Office Action dated Dec. 23, 2016", 7 pgs.
"Chinese Application Serial No. 201380073739.9, Office Action dated Dec. 29, 2017", w/English Translation, 26 pgs.
"European Application Serial No. 13880622.9, Communication Pursuant to Article 94(3) EPC dated Sep. 5, 2017", 4 pgs.
"European Application Serial No. 13880622.9, Extended European Search Report dated Nov. 7, 2016", 11 pgs.
"European Application Serial No. 13880622.9, Response Filed Jan. 10, 2018 to Communication Pursuant to Article 94(3) EPC dated Sep. 5, 2017", 2 pgs.
"European Application Serial No. 13880622.9, Response Filed May 19, 2017 to Extended European Search Report dated Nov. 7, 2016", 8 pgs.
"Extending idle mode DRX cycle by using NAS procedures", Samsung:3GPP Draft; S2-124264 UEPCOP S0LUTION_R2, 3RD Generation Partnership Project (3GPP), Mobile Competence Centre ; 650, Route Des Lucioles ; F-06921 Sophia-Antipolis Cedex; France, (Nov. 6, 2012), 4 pgs.
"International Application Serial No. PCT/US2013/077255, International Preliminary Report on Patentability dated Oct. 8, 2015", 8 pgs.
"International Application Serial No. PCT/US2013/077255, International Search Report dated Apr. 21, 2014", 3 pgs.
"International Application Serial No. PCT/US2013/077255, Written Opinion dated Apr. 21, 2014", 6 pgs.
"Introduction of longer SFN length for MTC", Samsung: 3GPP Draft; R2-100331, 3RD Generation Partnership Project (3GPP), Mobile Competence Centre ; 650, Route Deslucioles ; F-06921 Sophia-Antipolis Cedex; France, (Jan. 12, 2010), 2 pgs.
"Machine-Type and other Mobile Data Applications Communications Enhancement", 3GPP, 3GPP TR 23.887 V0.6.0, (Dec. 31, 2012), 94 pgs.
"Taiwanese Application Serial No. 103111024, Office Action dated Jul. 23, 2015", w/ English Translation, 11 pgs.
"Taiwanese Application Serial No. 103111024, Response filed Oct. 6, 2015 to Office Action dated Jul. 23, 2015", w/ English Claims, 19 pgs.
"Taiwanese Application Serial No. 105103027, Office Action dated Dec. 6, 2016", W/ English Translation, 28 pgs.
"Taiwanese Application Serial No. 105103027, Response filed Mar. 6, 2017 to Office Action dated Dec. 6, 2016", w/ English Translation, 8 pgs.
"Taiwanese Application Serial No. 106114307, Office Action dated Jan. 29, 2018", w/English Translation, 24 pgs.
"Taiwanese Application Serial No. 106114307, Response filed Apr. 20, 2018 to Office Action dated Jan. 29, 2018", W/O English Claims, 6 pgs.
"Technical Specification Group Services and System Aspects Machine-Type and other Mobile Data Applications Communications Enhancements (Release 12)", 3GPP TR 23.887, (Feb. 12, 2013), 8 pgs.
"Chinese Application Serial No. 201380073739.9, Office Action dated Sep. 5, 2018", w/English Claims and Partial English Translation, 15 pgs.
"Chinese Application Serial No. 201380073739.9, Response filed May 10, 2018 to Office Action dated Dec. 29, 2017", W/ English Claims, 15 pgs.
"3rd Generation Partnership Project Machine-Type and other Mobile Data Applications Communications Enhancements (Release 12)", ((3GPP TR 23.887)), (Dec. 18, 2012), 95 pgs.
"Chinese Application Serial No. 201380073739.9, Response filed Nov. 20, 2018 to Office Action dated Sep. 5, 2018", W/ English Claims, 18 pgs.

(56) References Cited

OTHER PUBLICATIONS

"Chinese Application Serial No. 201610596391.7, Office Action dated Nov. 19, 2018", w/English Translation, 19 pgs.
U.S. Appl. No. 14/779,024, U.S. Pat. No. 9,794,876, filed Sep. 22, 2015, Extended Paging Discontinuous Reception (DRX) Cycles in Wireless Communication Networks.

\* cited by examiner

EXTENDED PAGING DISCONTINUOUS RECEPTION (DRX) CYCLES IN WIRELESS COMMUNICATION NETWORKS

PRIORITY APPLICATION

This application is a Divisional of U.S. patent application Ser. No. 14/779,024, filed Sep. 22, 2015, now issued as U.S. Pat. No. 9,794,876, which is a U.S. National Stage Filing under U.S.C. 371 from International Application No. PCT/US2013/077255, filed Dec. 20, 2013, and published as WO 2014/158268 on Oct. 2, 2014, which application claims priority to U.S. Provisional Application Ser. No. 61/806,821, filed Mar. 29, 2013, and U.S. Provisional Application Ser. No. 61/808,597, filed Apr. 4, 2013, which are incorporated herein by reference in their entirety.

TECHNICAL FIELD

Embodiments pertain to wireless communications. Some embodiments relate to discontinuous reception (DRX) in wireless networks including those networks that operate in accordance with a 3GPP Evolved Universal Terrestrial Radio Access Network (E-UTRAN) Long-Term-Evolution Advanced (LTE-A) network standard or a 3GPP Universal Terrestrial Radio Access Network (UTRAN) Universal Mobile Telecommunications System (UMTS) network standard.

BACKGROUND

Power savings is important for wireless communication devices. In some conventional wireless communication networks, devices may enter a discontinuous reception (DRX) mode to save power when not communicating with other devices or with other entities in the network. Some current methods for power saving in DRX mode may be inefficient, particularly in the case of devices that perform machine-type communication (MTC) or that include applications that transmit in an automated fashion.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
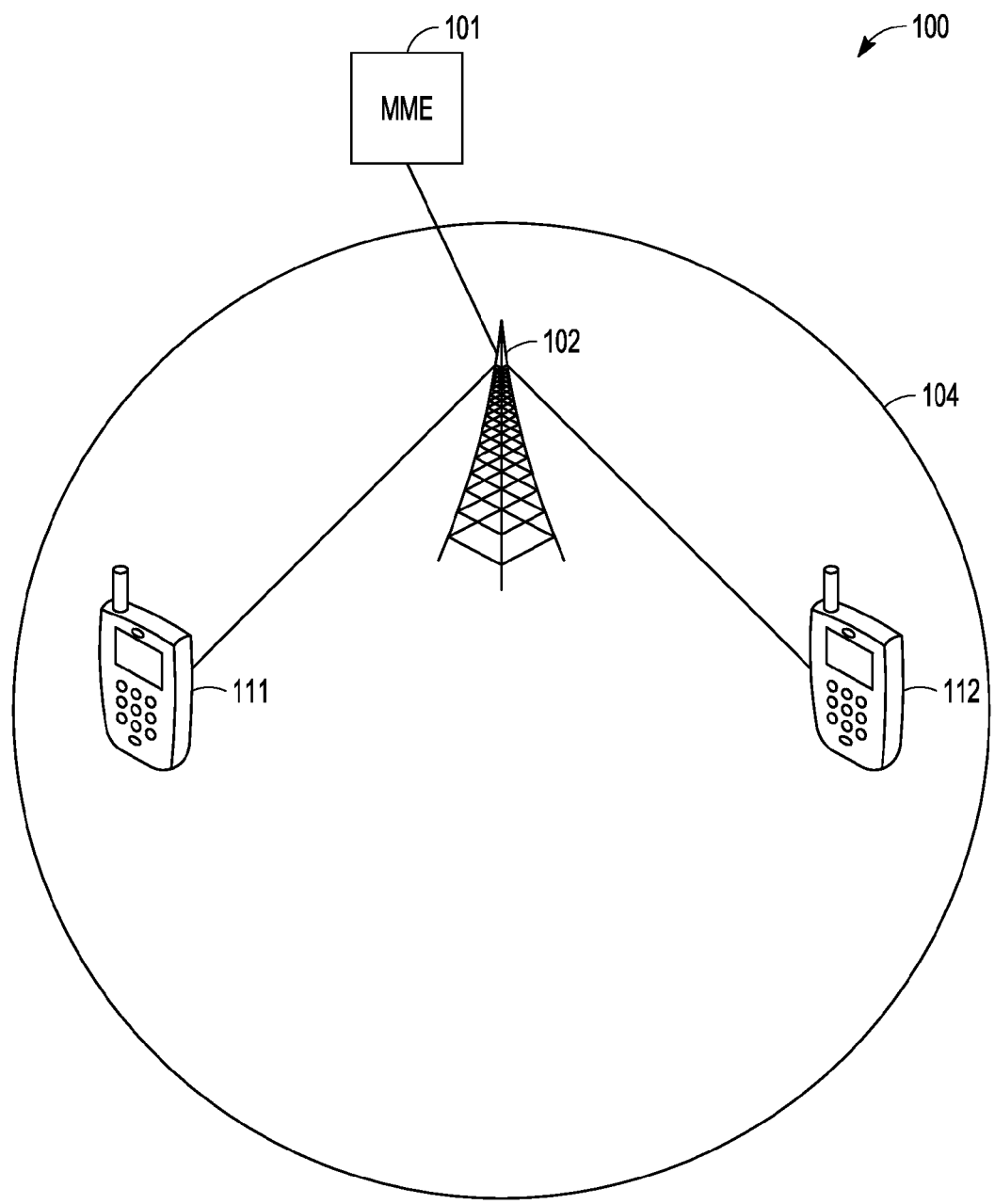
FIG. 1 shows a wireless communication network according to some embodiments described herein.

FIG. 1 shows a wireless communication network 100, according to some embodiments described herein. Wireless communication network 100 may include a mobile management entity (MME) 101, a base station, such as an evolved Node-B (eNodeB) 102, and user equipment (UEs) 111 and 112. ENodeB 102 and UEs 111 and 112 may operate to wirelessly communicate with each other in wireless communication network 100. While some embodiments herein are described regarding an eNodeB 102 and MME 101 operating in accordance with 3rd Generation Partnership Project (3GPP) standards for Long Term Evolution (LTE), other embodiments can be applicable to 3GPP standards for Universal Mobile Telecommunications System (UMTS) such as a NodeB, radio network controller (RNC) or serving general packet radio service (GPRS) support node (SGSN). Various embodiments herein are described with respect to 3GPP LTE standards, and if differences exist with 3GPP UMTS standards, these are pointed out where applicable.

An example of wireless communication network 100 includes an evolved universal terrestrial radio access network (EUTRAN) using 3GPP LTE standards operating in time division duplex (TDD) mode. Another example of wireless communication network 100 includes a EUTRAN using 3GPP-LTE standards operating in frequency division duplex (FDD) mode. Further examples of wireless communication network 100 include a UTRAN using 3GPP-UMTS standards operating in TDD, FDD, or dual-mode operation. Additional examples of wireless communication network 100 include Worldwide Interoperability for Microwave Access (WiMax) networks, 3rd generation (3G) networks, Wi-Fi networks, and other wireless data communication networks.

Examples of UEs 111 and 112 include cellular telephones (e.g., smartphones), tablets, e-readers (e.g., e-book readers), laptops, desktops, personal computers, servers, personal digital assistants (PDAs), web appliances, set-top boxes (STBs), network routers, network switches, network bridges, parking meters, sensors, and other devices. Some devices (e.g., parking meters) among these example devices may be considered as delay tolerant devices, which may include machine-type communication (MTC) devices. An MTC device may not need user interaction to initiate communication with the network (e.g., wireless communication network 100). Some other devices (e.g., smartphones) among these example devices may be not be considered as delay tolerant devices (e.g., non-MTC devices). A non-MTC device (e.g., user equipment (UE) such as a smartphone) may need user interaction to initiate communication with the network (e.g., wireless communication network 100).

MME 101 may be a main control node for wireless communication network 100. MME 101 may communicate with eNodeB 102 to track and send messages to UEs 111 and 112. MME 101 may communicate with other UEs besides UE 111 and 112 through one or more other eNodeBs similar to, or identical to, eNodeB 102. In 3GPP UMTS systems, network 100 can include a NodeB in communication with a radio network controller (RNC) and SGSN.

ENodeB 102 may operate as a serving eNodeB in a geographic area, such as cell 104 in wireless communication network 100. ENodeB 102 may be arranged (e.g., configured) to operate as an eNodeB in accordance with 3GPP-LTE standards or as a NodeB in accordance with 3GPP UMTS standards. FIG. 1 shows wireless communication network 100 including only one eNodeB (e.g., eNodeB 102)

as an example. Wireless communication network 100, however, may include multiple eNodeBs (e.g., multiple eNodeBs similar to, or identical to, eNodeB 102) or NodeBs. Each of the multiple eNodeBs or NodeBs may serve a particular cell in wireless communication network 100 and may or may not neighbor to eNodeB 102.

UEs 111 and 112 may be served by eNodeB 102 in cell 104. UEs 111 and 112 may be arranged (e.g., configured) to operate in accordance with 3GPP-LTE standards or UMTS standards. FIG. 1 shows wireless communication network 100 including only two UEs (e.g., UEs 111 and 112) served by eNodeB 102 in cell 104 as an example. Wireless communication network 100, however, may include more than two UEs served by eNodeB 102. ENodeB 102 and each of UEs 111 and 112 may operate to communicate with each other using an orthogonal frequency division multiple access (OFDMA) technique.

Each of UEs 111 and 112 may operate to receive OFDMA communication signals over a multicarrier communication channel in accordance with an OFDMA technique. The OFDMA technique may be operated either in frequency domain duplexing (FDD) mode that uses different uplink and downlink spectrum or in time domain duplexing (TDD) mode that uses the same spectrum for uplink and downlink. The OFDMA communication signals may comprise orthogonal subcarriers.

Each of UEs 111 and 112 may operate in different operational states. In one or more of these operational states, UE 111 may enter a power saving mode to save power. For example, UE 111 may enter a power saving mode after a specific amount of time of no active communication (e.g., no exchanging of data) between UE 111 and eNodeB 102. Similarly, UE 112 may enter a power saving mode after a specific amount of time of no active communication (e.g., no exchanging of data) between UE 112 and eNodeB 102. An example of a power saving mode in UEs 111 and 112 includes a discontinuous reception (DRX) mode, such as DRX mode in accordance with 3GPP-LTE or UMTS standards.

In 3GPP UMTS systems, UE 112 may be attached to different core network (CN) domains with different CN domain-specific DRX cycle lengths. For instance, in FDD mode the DRX cycle length for each CN domain equals $2^k$ radio frames, where k is the CN-specific DRX cycle length coefficient. In a circuit-switched (CS) domain, the network signals k to UE 112 in a system information block (SIB), for example SIB1. Therefore, k is not negotiable between the UE and the network in a CS domain. In a packet-switched (PS) domain, k may be negotiable using a non-access stratum (NAS) procedure, or if k is not negotiated in this fashion then the k signaled in the SIB may be used. In these or other systems, UE 112 stores the CN domain-specific DRX cycle length for each CN domain the UE 112 is attached to and uses the shortest of those DRX cycle lengths.

In Idle mode, UE 111 may remain in a sleep stage for an off-duration, such that most circuitry (e.g., radio receiver circuitry) in UE 111 is switched off. UE 111 may wake up during a paging occasion (PO) to monitor control information on a particular channel. For example, during a PO, UE 111 may wake up and monitor frames of a control channel for downlink information (e.g., paging messages from MME 101) or other information initiated by wireless communication network 100. As an example, if UE 111 and eNodeB 102 are arranged to communicate with each other in accordance with 3GPP-LTE standards, UE 111 may wake up during a PO and monitor transmission time instants of physical downlink control channel (PDCCH) in order to determine whether the UE 111 is being paged by wireless communication network 100. When not in a PO, UE 111 may refrain from monitoring the control channel (e.g., does not monitor the control channel) in order to reduce power consumption. As an example, if UE 111 and eNodeB 102 are arranged to communicate with each other in accordance with 3GPP-LTE standards, UE 111 may refrain from monitoring (e.g., does not monitor) transmission time instants of PDCCH during times outside of a PO.

Power saving in UE 111 may depend in part on the value (e.g., proportional to the value) of DRX cycle length. For example, a relatively greater value for DRX cycle length may improve power savings in UE 111. However, a greater value for DRX cycle length may increase delay for re-establishing a communication link between UE 111 and eNodeB (e.g., eNodeB 102) if control signals are present on the control channel while UE 111 is in DRX mode. Thus, depending on the type and/or device capability of UE 111, eNodeB 102 and UE 111 may communicate with each other to provide a balanced trade-off between reduced power consumption in UE 111 and quality of service (QoS). For example, if UE 111 is a delay tolerant device (e.g., an MTC device such as a parking meter), power savings may be preferable over delay (e.g., delay in accessing the network). Thus, in this example, UE 111 may use DRX cycle length having a value (e.g., an extended value) greater than that (e.g., a non-extended value) used by a non-MTC device in order to achieve a higher reduction in power consumption (e.g., more power savings). In another example, if UE 111 is a non-MTC device (e.g., a smartphone), quicker connection to the network may be more preferable than power savings. Therefore, in this example, UE 111 may use a DRX cycle length having a value (e.g., non-extended value) less than that (e.g., an extended value) used by an MTC device in order to maintain or achieve good user experience (e.g., quick connectivity and/or quality of service).

The value of DRX cycle length may be based on a DRX parameter value supported by (e.g., provided by) eNodeB 102. The DRX parameter value supported by eNodeB 102 may include a default DRX parameter value supported by eNodeB 102.

ENodeB 102 may be arranged (e.g., configured) to support a predetermined number (e.g., N) of different DRX parameter values $TC_1$ through $T_{CN}$ associated with the DRX cycle length. DRX parameter values $TC_1$ through $T_{CN}$ may include default DRX parameter values supported by eNodeB 102. ENodeB 102 may support a relatively larger number of DRX parameter values, such that eNodeB 102 may accommodate a relatively large number of corresponding DRX cycle lengths. As an example, eNodeB 102 may support more than four (e.g., N>4) DRX parameter values (e.g., default DRX parameter values) associated with more than four values of DRX cycle lengths (default DRX cycle lengths).

Each of DRX parameter values $T_{C1}$ through $T_{CN}$ may be used to determine the value of a corresponding DRX cycle length (that UE 111 may use during DRX mode). For example, if eNodeB 102 supports eight (e.g., N=8) DRX parameter values $T_{C1}$ through $T_{C8}$ ($T_{C1}$, $T_{C2}$, $T_{C3}$, $T_{C4}$, $T_{C5}$, $T_{C6}$, $T_{C7}$, and $T_{C8}$), then eight corresponding values for DRX cycle length may be determined. The description herein uses eight DRX parameter values for DRX cycle length as an example. ENodeB 102 may support a different number of DRX parameter values for DRX cycle length. DRX parameter value $T_{CN}$ may be the maximum value (e.g., maximum default value) among DRX parameter values $T_{C1}$ through $T_{CN}$. Thus, a maximum value (e.g., maximum default value) of a DRX cycle length (e.g., DRX cycle length) supported by eNodeB 102 may be determined based on a corresponding maximum DRX parameter value (e.g., $T_{CN}$) supported by eNodeB 102.

Each of DRX parameter values supported by eNodeB 102 may correspond to (e.g., be expressed by) the number of radio frames used in wireless communication network 100. For example, eNodeB 102 may support DRX parameter value $T_{C1}=32$ radio frames, $T_{C2}=64$ radio frames, $T_{C3}=128$ radio frames, $T_{C4}=256$ radio frames, $T_{C5}=W$ radio frames, and $T_{C6}=X$ radio frames, $T_{C7}=Y$ radio frames, $T_{C8}=Z$ radio frames, where $T_{C1}<T_{C2}<T_{C3}<T_{C4}<T_{C5}<T_{C6}<T_{C7}<T_{C8}$. Thus, if $T_{C4}$ is not greater than 256, then each of values W, X, Y, and Z can be any number of radio frames greater than 256 where $W<X<Y<Z$. The duration of each of the radio frames may be in the milliseconds range (e.g., 10 ms).

The value for DRX cycle length may be determined based on one of the DRX parameter values (e.g., one of $T_{C1}$ through $T_{CN}$) supported by eNodeB 102. The value of DRX cycle length may be determined in accordance with 3GPP-LTE or UMTS standards. For example, the value of DRX cycle length may be determined based on a lesser (e.g., minimum) of a device specified DRX parameter value (e.g., $T_{DEV}$) and the eNodeB specified DRX parameter value (e.g., one of $T_{C1}$ through $T_{CN}$).

Various embodiments provide methods for extended paging DRX cycles in an RRC idle state to aid in further UE power savings for MTC or other applications. Current 3GPP UMTS specifications define paging DRX cycles up to 5120 ms, and current 3GPP-LTE specifications define paging DRX cycles of up to 2560 ms. MTC applications may be executing in a large number of low-mobility UEs 112 and may transmit small data relatively infrequently. If UEs 111 and 112 running such applications must wake up for every paging occasion, this may drain batteries of UEs 111 and 112. Accordingly, various embodiments allow longer paging DRX cycles by providing extended values for paging DRX cycles through definition of extended DRX cycle values, scaling of existing values, or other mechanisms.

Extended DRX Cycle Values

In various embodiments, extended values for DRX cycle length are provided. In current systems defined in accordance with 3GPP technical standards (TS) 24.008 and 24.301, the values are signaled in a field of the DRX Parameter Information Element (IE), and various embodiments extend the values defined in this field. In various other embodiments, UE 112 can send a desired extended DRX cycle length to the network in, for example the NAS container as part of a newly defined IE, to the SGSN in the case of 3GPP UMTS systems or to the MME in the case of 3GPP-LTE systems. UE 112 can send the desired extended DRX cycle length during different procedures such as an Attach Request (in the case of both the 3GPP LTE and UMTS systems), a Routing Area Update (RAU) Request (in the case of 3GPP UMTS systems), or a Tracking Area Update (TAU) request (in the case of 3GPP-LTE systems).

After receiving this new extended DRX Cycle value, in 3GPP UMTS systems, the SGSN may indicate the value to the RNC in, for example, an Iu paging message or the SGSN may propose another value. In the case of 3GPP-LTE systems, the MME 101 may indicate the value to eNodeB 102 in an S1 paging message if MME 101 accepts the value, or MME 101 can propose another value.

When eNodeB 102 (or RNC for 3GPP UMTS systems) receives the extended paging DRX cycle value from MME 101 (or SGSN for 3GPP UMTS systems), eNodeB 102 will apply the extended paging DRX cycle value. This is in contrast to current systems, operating in accordance with 3GPP TS 25.304 or TS 36.304 specifications, which select the shortest of the stored CN domain specific DRX cycle length and the default cycle value advertised from the eNodeB 102. Similarly, UE 112 will apply the UE-defined value for paging or wait until an acknowledgement is received before using the UE-defined value for paging. In some embodiments, MME 101 (or SGSN) may execute logic to inform eNodeB 102 (or RNC) what rule to apply for selecting the DRX cycle length.

Network Signaling of Extended Paging DRX Cycle Support

ENodeB 102 (or NodeB for 3GPP UMTS systems) may signal support for extended paging DRX in SIB2 (SIB1 for 3GPP UMTS systems), or in a newly defined SIB. ENodeB 102 (or NodeB) may broadcast this message, and if the message is available prior to an Attach Request, the message may provide UE 112 with information regarding the extended DRX support of eNodeB 102 (or NodeB). UE 112 may also use the message to update UE-specific DRX cycle lengths or CN domain specific DRX cycle lengths using RAU request (for 3GPP UMTS systems), TAU request (for 3GPP LTE systems), etc. Network 100 can also redirect UE 112 to a different cell that supports extended paging DRX cycles or that supports a value requested by UE 112 for extended paging DRX cycle. Network 100 may perform this redirection upon considering, for example, network conditions.

UE Signaling Extended Paging DRX Cycle Value

In current systems according to 3GPP TS 24.008 and 24.301, an Attach Request message is defined that contains a DRX parameter (3 octets long) that indicates whether a UE 111 supports the DRX mode and the UE-specific (or CN domain specific) DRX cycle length(s). However, embodiments are not limited to including the DRX parameter in an Attach Request message, and the DRX parameter can be added in, for example, TAU or RAU. In various embodiments, additional values for DRX cycle length are added to the third octet of this DRX parameter. However, because the system frame number (SFN) is affected for cycle lengths beyond a certain value, the UE and network 100 both need to signal support for extended paging DRX cycles.

In various other embodiments, a new information element identifier (IEI), is added to NAS messages such as Attach Request, RAU request (in 3GPP UMTS systems), or TAU request (in 3GPP LTE systems). Presence of this IEI, which may be named "Extended DRX parameter" though embodiments are not limited thereto, indicates that UE 111 is interested in and capable of extended paging DRX. Instead of or in addition to defining an Extended DRX parameter IEI, an existing DRX parameter value defined in 3GPP TS 24.008 and 24.301, can be changed.

In some embodiments, the IEI includes extended DRX cycle values. In at least those embodiments, it is assumed that SFN is extended as necessary to account for the DRX extension. An example extended DRX parameter IE according to this embodiment is shown below:

TABLE 1

Proposed Extended DRX parameter IE and contents - case 1

Extended DRX parameter IEI
octet 1
Extended DRX value
octet 2

However, in current systems, a wrap-around of SFN happens every 40.96 seconds (in 3GPP UMTS systems) or every 10.24 seconds (in 3GPP LTE systems). Accordingly, in various embodiments, an SFN wrap-around factor is introduced, which specifies the number of cycles that should pass before the paging message may be read by UE 111. An example extended DRX parameter IE according to these embodiments is shown below:

TABLE 2

Proposed Extended DRX parameter IE and contents - case 2

Extended DRX parameter IEI
octet 1
SFN Wrap-around factor and Extended DRX value octet 2

The SFN wrap-around factor may also be specified as an SFN multiplier, SFN cycle index, or SFN repetition factor. ENodeB 102 and UE 111 shall store the SFN wrap-around factor in addition to other information to calculate the paging frame (PF) and paging occasion (PO) at which UE 111 shall listen to the paging messages.

If MME 101 accepts the indicated extended DRX Cycle value from UE 111 or any of the new extended DRX Cycle values then UE 111 and eNodeB 102 determine the paging frame (PF) and paging occasion (PO) within PF as in Equation (1) below:

$$PF = SFN \bmod T = (T \div N)*(UE\_ID \bmod N) \qquad (1)$$

In some embodiments, T is the DRX cycle (represented in frames), defined as the longer of the negotiated extended UE specific DRX cycle provided by the upper layers or received from MME 101 and the default paging cycle advertised in SIB2, and N and other parameters specified in 3GPP TS 36.304. In other embodiments, T may refer directly to the UE specific extended DRX cycle with the broadcast value being ignored. In still other embodiments, eNodeB 102 may broadcast cell-specific values in system information, for example defaultpagingcycle and defaultextendedpagingcycle, such that T will continue to refer to the shorter of UE specific DRX cycle and one of the two default paging cycle values.

If MME 101 rejects the indicated extended DRX Cycle value requested by UE 111, then UE 111 and eNodeB 102 calculate the PF and PO in accordance with current 3GPP specification.

In various other embodiments, UE 111 can use the device properties IE to signal a desired DRX cycle in NAS messages such as Attach Request, RAU request (in 3GPP UMTS systems), or TAU request (in 3GPP LTE systems) or Extended Service Request (in 3GPP LTE systems). UE 111 can signal an index, and this index can represent a multiplier to the DRX cycle that UE 111 is signaling. In accordance with 3GPP TS 24.008 and 24.301, the device properties IE currently has three spare bits that can be used in some embodiments to provide the multiplier to the DRX cycle. In various embodiments, a table could be added to map the index to the actual multiplier. If only a single extended DRX cycle is to be defined, then a single spare value could be used, which would correspond to a single multiplier value. Moreover, whether UE 111 is low priority device could be taken into consideration to further extend the multiplier value. An example table is shown below, where M1, M2, ... M6 are pre-defined numbers.

TABLE 3

Mapping for Device Properties IE

| Signaled value | Low priority (0 = false) | Multiplier |
| --- | --- | --- |
| 0 | 0 | DRX parameter |
| 0 | 1 | DRX parameter |
| 1 | 0 | M1 * DRX parameter |
| 1 | 1 | M2 * DRX parameter |
| 2 | 0 | M3 * DRX parameter |
| 2 | 1 | M4 * DRX parameter |
| 3 | 0 | M5 * DRX parameter |
| 3 | 1 | M6 * DRX parameter |

Low access priority (i.e., delay tolerant) UEs 111 can tolerate large latency. Extending the DRX cycle for such UEs 111 implies UEs 111 will wake up less often to receive downlink data. Because such UEs 111 do not have strict latency requirements, these UEs 111 can have longer DRX cycles. Accordingly, the multiplier for low priority UEs 111 can be set relatively larger than would be the case for non-delay tolerant devices.

In some embodiments, a spare bit can be used simply for UE 111 to indicate whether or not it supports an extended DRX Cycle. As another option, the spare values can be used by the network in combination with the low priority indication. In at least these embodiments, it is assumed that some UEs 111 are more flexible in terms of delay tolerance, such that these UEs 111 can perform satisfactorily with high DRX cycles. When such a UE 111 signals to the network that it is "delay tolerant", it could also signal to the network (using the spare bits in the device properties IE) what type of DRX cycle the UE supports. Given two UEs 111 that are delay tolerant, with one that can support larger DRX cycles than the other, the UEs 111 can signal whether UE 111 should receive a DRX cycle in a top or lower portion of a range. In this solution the network uses the knowledge that the UE is low priority combined with the signaled valued (from spare bits) to decide which DRX to use. For each signaled value the network will have a range of extended DRX cycles. If UE 111 is low priority, the network will assign the top values in that range:

TABLE 4

Combination with Low Priority Indication on Network Side

| Signaled Value | Low Priority | Range of Extended DRX cycles in the network | |
| --- | --- | --- | --- |
| 0 | 0 | R1-R2 | Network should assign extended DRX cycle in the lower part of the range |
| 0 | 1 | R1-R2 | Network should assign extended DRX cycle in the upper part of the range |
| 1 | 0 | R3-R4 | Network should assign DRX cycle in the lower part of the range |
| 1 | 1 | R3-R4 | Network should assign DRX cycle in the upper part of the range |

MME/SGSN Signaling for Extended DRX Cycles

Attach Accept message is sent by the network (e.g., SGSN or MME 101) to UE 111 to indicate that the corresponding Attach Request has been accepted. As part of Attach Request, if UE 111 had indicated an extended paging DRX, then the MME or SGSN may indicate whether that value was accepted or not based on network parameters. In accordance with current 3GPP LTE and UMTS specifications, DRX cycle values are restricted, and the MME or SGSN accepts values from UE 111 and forwards the value to eNodeB 102 or RNC, as appropriate, after updating the SGSN or MME database.

However, in various embodiments that provide an extended paging DRX value, if the network does not deem the value to be feasible, network indicates this to UE 111 and either suggests an alternative value or suggests use of the default broadcast by NodeB or eNodeB 102. In determining this, the network can consider factors such as whether all the NodeBs or eNodeBs in the Routing area, tracking area, etc. support extended paging DRX.

The contents of the extended paging DRX value can correspond to changes proposed above regarding UE messaging. This negotiation may be based on the Extended DRX parameter or additional values within the existing DRX parameter.

In 3GPP LTE systems, MME 101 can provide an indication to an eNodeB 102 that MME 101 has accepted UE 111 specific DRX cycle as requested by the UE 111 in the TAU request message or the Attach Request message. Some embodiments include adding an extended paging DRX cycle parameter IE to S1-paging messages defined in 3GPP TS 36.413.

Similarly, for 3GPP UMTS systems, an SGSN can provide an indication to an RNC for the accepted UE 111 specific DRX cycle as requested by the UE in an Attach request or RAU request message. Some embodiments include adding an extended paging DRX cycle parameter in an Iu-Paging message defined in 3GPP TS 25.413.

In 3GPP LTE systems, eNodeB 102 informs MME 101 that eNodeB 102 supports extended DRX cycles in S1 setup request messages and eNodeB configuration update messages, which are currently defined in 3GPP TS 36.413. Some embodiments can add an Extended Paging DRX support IE to one or both of these messages. An example portion of an S1 setup message that can be defined in 3GPP TS 36.413 section 9.1.8.4, and associated ASN.1 code, is shown in Table 5:

TABLE 5

S1 Setup Request.

| IE/Group Name | Presence (M = Mandatory, O = Optional) | IE type and reference | Semantics description |
| --- | --- | --- | --- |
| Extended paging DRX support | Optional | ENUMERATED (true) or BIT STRING (1) | This IE indicates to the MME that the eNodeB is capable of supporting extended DRX |

```
S1SetupRequestIEs S1AP-PROTOCOL-IES ::={
....
{ID id-ExtendedPagingDRXSupport CRITICALITY ignore TYPE
ENUMERATED PRESENCE optional},
...
}
ENBConfigurationUpdate ::= SEQUENCE {
    protocolIEs ProtocolIEContainer { {ENBConfigurationUpdateIEs} },
}
ENBConfigurationUpdateIEs S1AP-PROTOCOL-IES ::={
}
    {ID id-ExtednedPagingDRXSupport CRITICALITY ignore TYPE
ENUMERATED PRESENCE optional},
...
}
```

Updates to Signaling Connection Release Indication Procedures to Support Extended Paging DRX Some embodiments can configure UE 111 with extended paging DRX cycles using a Signaling Connection Release Indication procedure. In accordance with current UMTS specifications, UE 111 in the connected mode RRC state CELL_DCH may send the Signaling Connection Release Indication message to request the UTRAN to release one of its NAS signaling connections in a CN domain. UTRAN may respond by transmitting a Signaling Connection Release message to release the requested NAS signaling connection. Subsequently, UTRAN may switch UE 111 to a more battery efficient RRC state, i.e. either to Idle mode (by sending an RRC connection release message) or to the connected mode states CELL_FACH, CELL_PCH or URA_PCH (by sending e.g. Radio Bearer Reconfiguration message).

In accordance with these embodiments, the existing Signaling Connection Release Indication, Signaling Connection Release, Radio Bearer Reconfiguration and RRC Connection Release message are extended using the IE Extended Paging DRX discussed above with respect to modifications to the Device Properties IE. In embodiments in which the IE Extended Paging DRX is included in the Signaling Connection Release Indication message, UE 111 requests UTRAN to be configured with longer paging DRX cycles in either idle or connected mode states. Furthermore, as response the UTRAN may include the IE Extended Paging DRX in either of the messages Signaling Connection Release, Radio Bearer Reconfiguration and RRC Connection Release to indicate to UE 111 whether the extended paging DRX requested by UE 111 has been accepted or not. In other embodiments, the UTRAN can indicate a different extended paging DRX, and shall be used in either idle or connected mode states.

Example Signaling Diagrams for Extended Paging DRX Cycle

Figure 2:
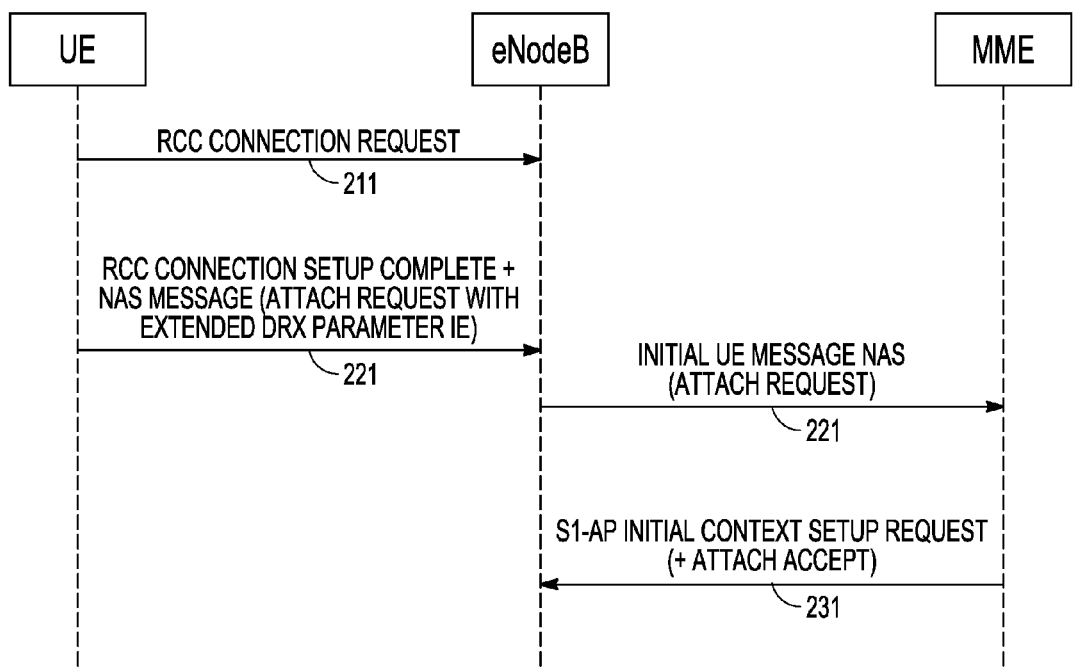
FIG. 2 shows an example communication among elements and devices in a network according to some embodiments described herein.

FIG. 2 shows an example communication among elements and devices in a network 100, according to some embodiments described herein. Elements can include MME 101, eNodeB 102, and UE 111. The communication shown in FIG. 2 may include messages (e.g., in the form of radio frequency (RF) signals), such as messages 211, 221, and 231. However, as will be understood by one of ordinary skill in the art, other messages and signaling, for example paging signals or other signals, may occur.

UE 111 may send message 211 to eNodeB 102. Message 211 may include information to request establishing a communication link (e.g., radio connection) between UE 111 and eNodeB 102. For example, message 211 may include an RRC Connection Request message in accordance with 3GPP-LTE standards. Thus, message 211 may include information identifying device identity and an RRC establishment cause in accordance with 3GPP-LTE standards. In the example associated with FIG. 2, UE 111 may include a delay tolerant device. Thus, the establishment cause included in message 211 sent by UE 111 may include a delay tolerant establishment cause. ENodeB 102 may re-establish an appropriate communication link with UE 111 based on at least in part the delay tolerant establishment cause indicated by UE 111. For example, based on the delay tolerant establishment cause indicated by UE 111, MME 101 and eNodeB 102 may provide (e.g., send) an extended (e.g., default) DRX parameter value (e.g., one of $T_{C5}$ through $T_{CN}$) associated with an extended (e.g., default) DRX cycle length to UE 111 for use in DRX mode.

UE 111 may also send message 221 to eNodeB 102. Message 221 may be sent after message 211 is sent in order to complete a communication link establishment between UE 111 and eNodeB 102. Message 221 may include information indicating device capability of UE 111. Message 221 may include an Attach Request message in accordance with 3GPP-LTE standards. Message 221 can include an Extended Service request message in accordance with 3GPP LTE standards. As described herein, message 221 may include an extended DRX parameter IE that includes UE 111's desired DRX paging cycle. ENodeB 102 may in turn transmit this message to MME 101. In message 231, MME 101 can accept the requested DRX paging cycle, or propose another value as described above.

Figure 3:
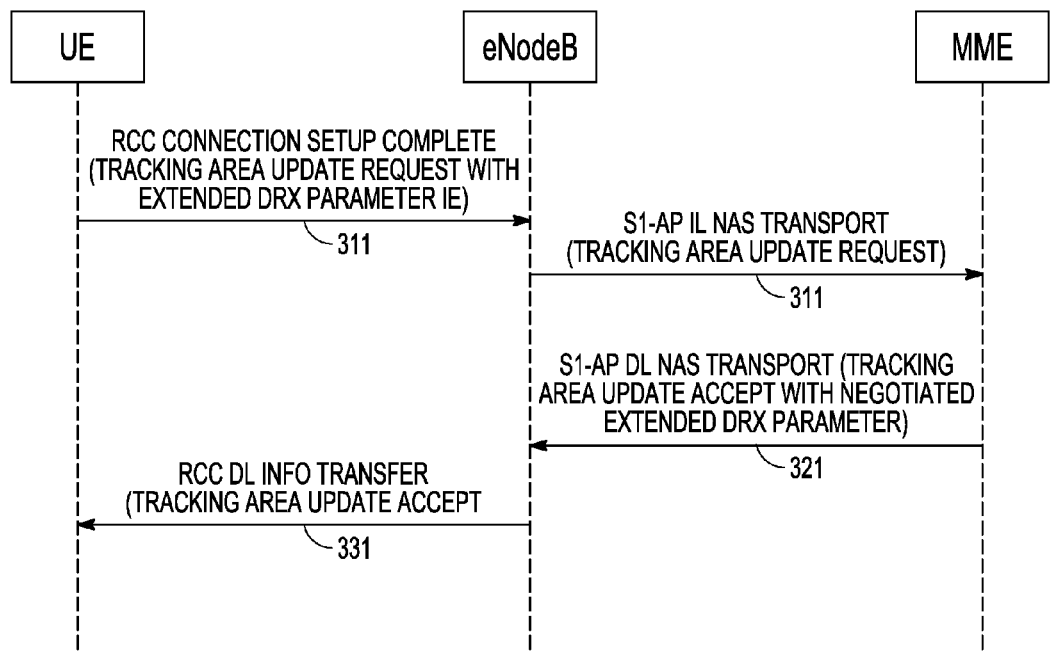
FIG. 3 shows an example communication for idle mode to connected mode transition for Tracking Area Update (TAU) procedure according to some embodiments described herein.

FIG. 3 shows an example communication for idle mode to connected mode transition for Tracking Area Update (TAU) procedure according to some embodiments described herein in systems supporting 3GPP LTE. Similar signaling may apply for 3GPP UMTS systems. The communication shown in FIG. 3 may include messages (e.g., in the form of radio frequency (RF) signals), such as messages 311, 321 and 331. However, as will be understood by one of ordinary skill in the art, other messages and signaling, for example paging signals or other signals, may occur.

Initial signaling may be similar to that shown in FIG. 2 and therefore is not described with respect to FIG. 3. UE 111 may send message 311 to eNodeB 102. Message 311 may include information to request a tracking area update. For example, message 311 may include an RRC Connection Setup Complete message in accordance with 3GPP-LTE standards. Message 311 can include a requested extended DRX parameter IE as described herein. ENodeB 102 may pass message 311 on to MME 101.

In message 321, MME 101 can accept the requested DRX paging cycle, or propose another value as described above. The eNodeB 102 can transmit message 331, which can include for example RRC DL Info Transfer, to indicate to the UE 111 that the MME has accepted the extended DRX parameter.

Increasing Paging DRX Cycle Through Use of Scaling Factors

In various other embodiments, the number of available DRX parameters are maintained, and a scaling factor, PagingCycleSF is added with integer values of 0-12. In addition to the defaultPagingCycle currently broadcast by the eNodeB 102 in current systems, the eNodeB 102 can also communicate the PagingCycleSF in the System Information. The UE 111 may also select a value of PagingCycleSF to transmit to the eNodeB 102 when the UE 111 transmits a UE-specific DRX cycle. In various embodiments, the DRX cycle T of the UE 111 can therefore be calculated according to:

$$T = \text{defaultPagingCycle} * 2^{\wedge}(\text{PagingCycleSF}) \quad (2)$$

In various other embodiments, rather than calculating the minimum of the paging cycle and the UE-specific DRX cycle value to determine a paging cycle of UE 111, the network and the UE 111 specify a device-specific scaling factor, PagingDeviceSF. The UE 111 can specify a desired value of this parameter, but the value that will be used will ultimately be decided by the network and communicated to the UE 111. PagingDeviceSF may have integer values of 0-12, similar to PagingCycleSF, and will be set on a UE-specific basis. Accordingly, different devices can have different scaling factors and corresponding different paging cycles.

The UE 111 paging cycle can therefore be calculated according to:

$$\text{Min}(\text{defaultPagingCycle},\text{UE-specific DRX}) * 2^{\wedge}\text{PagingDeviceSF} \quad (3)$$

Or $$\text{Min}(\text{defaultPagingCycle} * \text{PagingCycleSF},\text{UE-specific DRX}) * 2^{\wedge}\text{PagingDeviceSF} \quad (4)$$

Equation (3) would be used for embodiments in which the UE-specific DRX parameter is changed according to Equation (2). Equation (4) would be used for embodiments in which the PagingCycleSF is defined.

In various embodiments, the paging cycle can be set by the eNodeB 102. In current 3GPP LTE systems, the eNodeB 102 communicates the defaultPagingCycle in system information for all UEs 111 in the network 100.

Figure 4:
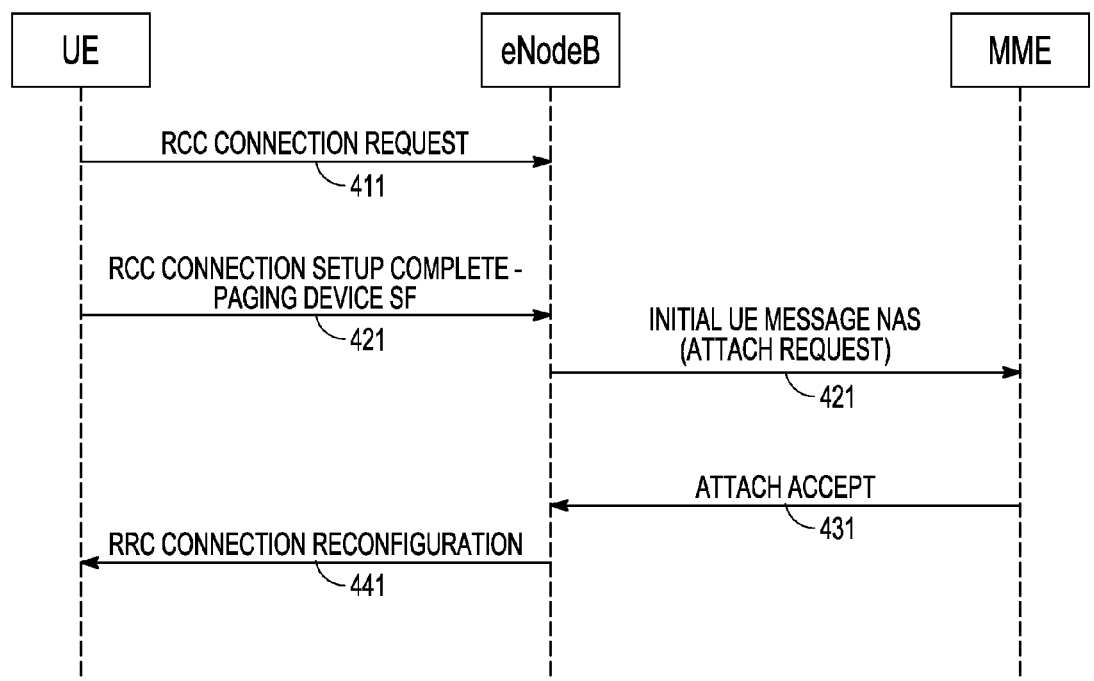
FIG. 4 illustrates an example signaling of paging scaling factors in accordance with at least some embodiments.

FIG. 4 illustrates an example signaling of paging scaling factors in accordance with at least some embodiments. FIG. 4 may include messages (e.g., in the form of radio frequency (RF) signals), such as messages 411, 421, 431 and 441. However, as will be understood by one of ordinary skill in the art, other messages and signaling, for example paging signals or other signals, may occur.

UE 111 may send message 411 to the eNodeB 102. Message 411 may include information to request establishing a communication link (e.g., radio connection) between UE 111 and the eNodeB 102. For example, message 411 may include an RRC Connection Request message in accordance with the 3GPP-LTE standards. Message 411 may indicate that the UE 111 is an MTC device by setting an Establishment Cause to delayTolerantAccess.

In message 421, the UE signals the eNodeB 102, which signals MME 101, that the UE 111 is an MTC device by including a Device Properties IE in an Attach Request message. Message 421 can also include UE-specific DRX cycle information and PagingDeviceSF as described herein.

When MME 101 receives the Attach Request message 421, depending on whether the UE 111 is MTC or non-MTC and based on considerations such as the type of applications and subscription that UE 111 is registered for, the MME looks up the maximum paging cycle limit for the UE 111 (which may be stored in the HSS or elsewhere) and sets the paging cycle limit accordingly. The MME communicates this information in message 431, which can include an Attach Accept message containing information paging cycle information and the parameter proposed in some embodiments, PagingDeviceSF. The eNodeB 102 communicates the value on to the UE 111 in message 441, which can include an RRC Connection Reconfiguration message.

Example Device for Implementing Embodiments

Figure 5:
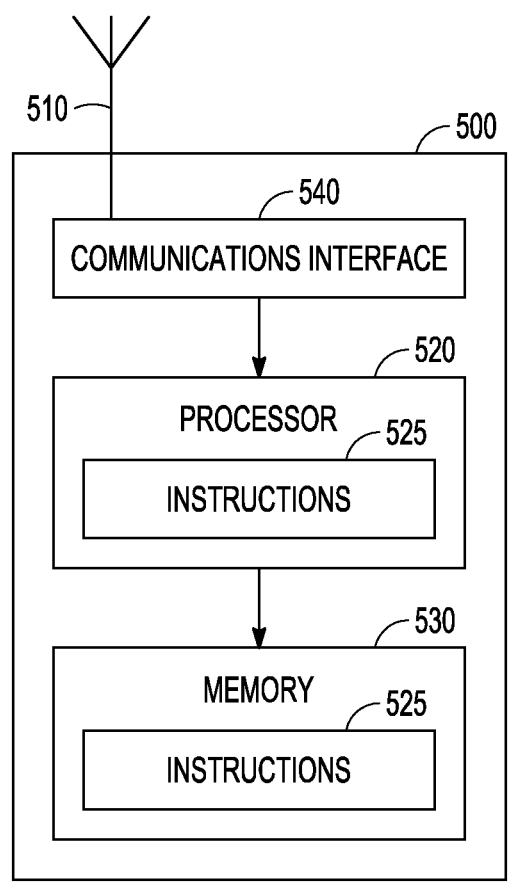
FIG. 5 shows an example block diagram of a user equipment (UE), according to some embodiments described herein.

FIG. 5 is a block diagram of the basic components of a UE 500 in accordance with some embodiments. The UE 500 may be suitable as a UE 111 (FIG. 1). The UE 500 may support methods for power saving in accordance with embodiments described above with respect to FIG. 1-4.

The UE 500 includes one or more antennas 510 arranged to communicate with a NodeB, an eNodeB 102 (FIG. 1), or other types of wireless local area network (WLAN) access points. The UE 500 further includes a processor 520, instructions 525, and a memory 530. The UE 500 may further include a communications interface 540. In one embodiment, the memory 530 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data.

Example embodiments allow a UE 500 to transmit, using the communications interface 540, a non-access stratum (NAS) message to the network, indicating that the UE desires to use the extended paging DRX value and to receive a message from the network that includes an information element (IE) indicating whether the network supports the extended paging DRX value. The NAS message can include an Attach Request message, and the extended paging value can be indicated in a DRX Parameter IE included in the Attach Request message. In some embodiments, the NAS message may include an Attach Request message, a Tracking Area Update Request message, or a Routing Area Update Request message, in which the extended paging value is indicated in an Extended DRX parameter IE. The communications interface 540 can receive, in response to the Attach Request, an Attach Accept message that includes an Extended DRX parameter IE. In at least one embodiment, the communications interface 540 is, for example, a wireless physical layer which operates according to a multiple input/multiple output (MIMO) operation.

The processor 520 may include logic or code to enable the UE 500 to process signals received from the network through the antenna 510. The processor 520 may include code or other instructions 525 to allow the UE 500 to determine to use an extended paging discontinuous reception (DRX) value to increase a paging cycle length to a value greater than a first value, when the UE is operating in a network in accordance with a standard of a 3rd Generation Partnership Project (3GPP) family of standards for Long Term Evolution (LTE), and a second value, when the UE is operating in a network in accordance with a standard of the Universal Mobile Telecommunications System (UMTS) family of standards. The instructions 525 may further allow the UE 500 to configure a non-access stratum (NAS) message for transmission to the eNodeB 102 indicating that the UE desires to use the extended paging DRX value. The instructions 525 may further allow the UE 500 to receive a message from the eNodeB 102, in response to the NAS message, which includes an information element (IE) indicating whether the network supports the extended paging DRX value.

The instructions 525 can allow the UE 500 to receive, in response to the Attach Request, an Attach Accept message that includes an Extended DRX parameter IE. The instructions 525 can also allow the UE 500 to determine a scaling factor by which to multiply the paging cycle length for the UE, wherein the determination is based on one or more of a device type of the UE and a type of one or more applications executing on the UE. The instructions 525 can allow the UE 500 to transmit the scaling factor to the network in a Device Properties IE.

Example eNodeB for Implementing Embodiments

Figure 6:
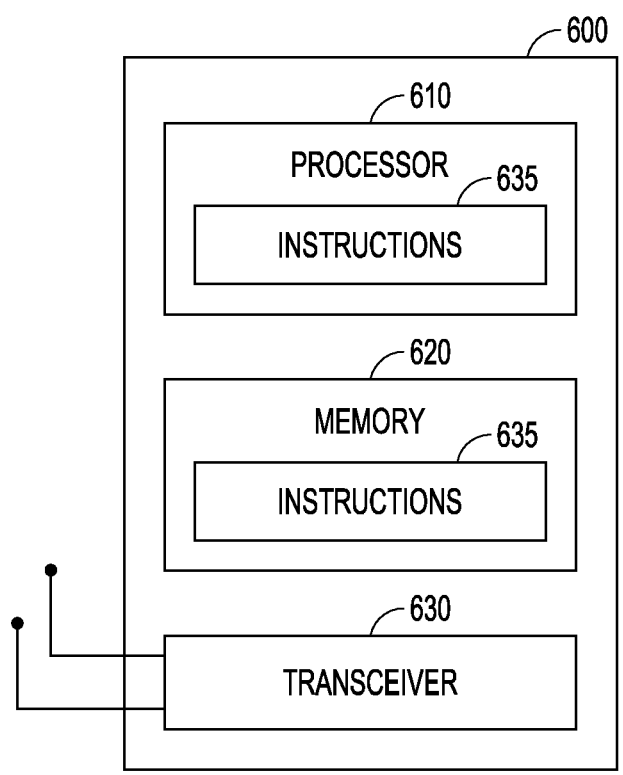
FIG. 6 is a block diagram showing details of an eNodeB according to some embodiments described herein.

FIG. 6 is a block diagram showing details of an eNodeB 600 according to some embodiments. The eNodeB 600 may be suitable as eNodeB 102 (FIG. 1). While some embodiments are described with respect to an eNodeB that operates in accordance with 3GPP LTE, other embodiments can include similar circuitry for implementing functions of a NodeB in accordance with a 3GPP UMTS standard. The eNodeB 600 includes a processor 610, a memory 620, a transceiver 630, and instructions 635. The eNodeB 600 may include other elements (not shown).

The processor 610 comprises one or more central processing units (CPUs), graphics processing units (GPUs), or both. The processor 610 provides processing and control functionalities for the eNodeB 600. Memory 620 comprises one or more transient and static memory units configured to store instructions 635 and data for the eNodeB 600.

The transceiver 630 comprises one or more transceivers including a multiple-input and multiple-output (MIMO) antenna to support MIMO communications. The transceiver 630 receives UL transmissions and transmits DL transmissions, among other things, from and to UE 111 (FIG. 1).

The transceiver 630 can transmit a radio resource control (RRC) signal that includes an information element (IE) indicating whether the eNodeB supports user equipment (UE) usage of an extended paging value. The transceiver 630 can receive from the MME 101 (FIG. 1) or other network entity such as SGSN, the extended paging value, responsive to a request from the UE 111 to use the extended paging value.

The transceiver 630 can receive a message that indicates a degree to which the UE 111 is delay tolerant. The transceiver 630 can receive this indication in an Attach Request message from a UE 111. However, embodiments are not limited thereto, and the transceiver 630 can also receive this indication in a TAU request, an extended service request, or a RAU request, for example. The Attach Request message may include a desired scaling factor of the UE 111, wherein the desired scaling factor is a number by which the UE 111 will multiply a paging cycle value to generate a device-specific paging cycle for the UE 111. The processor 610 can determine whether to permit the UE 111 to use the desired scaling factor, and to configure an RRC Connection Reconfiguration message that includes an indication of whether the UE 111 is permitted to use the desired scaling factor.

The processor 610 can redirect the UE 111 to a neighboring NodeB or eNodeB in network 100 (FIG. 1) that supports usage of the extended paging value upon determining to not support the extended paging value. The processor 610 may first determine whether the UE 111 is delay tolerant before performing this redirecting. The processor 610 can select an extended DRX value from a list of extended DRX values, based on the degree to which the UE 111 is delay tolerant.

The instructions 635 comprise one or more sets of instructions or software executed on a computing device (or machine) to cause such computing device (or machine) to perform any of the methodologies discussed herein. The instructions 635 (also referred to as computer- or machine-executable instructions) may reside, completely or at least partially, within the processor 610 and/or the memory 620 during execution thereof by the eNodeB 600. The processor 610 and memory 620 also comprise machine-readable media.

The techniques described herein may improve power consumption for some UEs (e.g., delay tolerant devices such as MTC devices) and also maintain and/or improve good user experience for some other UEs (e.g., non-MTC devices). For example, the techniques described herein may allow some UEs (e.g., MTC devices) to use a value (e.g., extended value) for DRX cycle length (e.g., based on one of $T_{C5}$ through $T_{CN}$) in DRX mode in order to achieve a higher reduction in power consumption. The techniques described herein may also allow some other UEs (e.g., non-MTC devices) to use another value (e.g., non-extended value) for DRX cycle length (e.g., based on one of $T_{C1}$ through $T_{C4}$) in DRX mode in order to maintain and/or improve good user experience.

As those of ordinary skill in the art will readily appreciate, various aspects described throughout this disclosure may be extended to other telecommunication systems, network architectures and communication standards. By way of non-limiting example, various aspects may be extended to other Universal Mobile Telecommunications System (UMTS) systems. Various aspects can be used in systems employing Long Term Evolution (LTE) (in FDD, TDD, or both modes), and LTE-Advanced (LTE-A) (in FDD, TDD, or both modes).

Examples, as described herein, may include, or may operate on, logic or a number of components, components, or mechanisms. Components are tangible entities capable of performing specified operations and may be configured or arranged in a certain manner. In an example, circuits may be arranged (e.g. internally or with respect to external entities such as other circuits) in a specified manner as a component. In an example, the whole or part of one or more computer systems (e.g. a standalone, client or server computer system) or one or more hardware processors may be configured by firmware or software (e.g. instructions, an application portion, or an application) as a component that operates to perform specified operations. In an example, the software may reside (1) on a non-transitory machine-readable medium or (2) in a transmission signal. In an example, the software, when executed by the underlying hardware of the component, causes the hardware to perform the specified operations.

Accordingly, the terms "component" and "component" are understood to encompass a tangible entity, be that an entity that is physically constructed, specifically configured (e.g. hardwired), or temporarily (e.g. transitorily) configured (e.g. programmed) to operate in a specified manner or to perform part or all of any operation described herein. Considering examples in which components are temporarily configured, one instantiation of a component may not exist simultaneously with another instantiation of the same or different component. For example, where the components comprise a general-purpose hardware processor configured using software, the general-purpose hardware processor may be configured as respective different components at different times. Accordingly, software may configure a hardware processor, for example, to constitute a particular component at one instance of time and to constitute a different component at a different instance of time.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure. The preceding description and the drawings sufficiently illustrate specific embodiments to enable those of ordinary skill in the art to practice them. Other embodiments may incorporate structural, logical, electrical, process, and other changes. Portions and features of some embodiments may be included in, or substituted for, those of other embodiments.

The techniques described herein may improve power consumption for some UEs (e.g., delay tolerant devices such as MTC devices) and also maintain and/or improve good user experience for some other UEs (e.g., non-MTC devices). For example, the techniques described herein may allow some UEs (e.g., MTC devices) to use a value (e.g., extended value) for DRX cycle length in DRX mode in order to achieve reductions in power consumption. The techniques described herein may also allow some other UEs (e.g., non-MTC devices) to use another value (e.g., non-extended value) for DRX cycle length in DRX mode in order to maintain and/or improve good user experience.

ADDITIONAL NOTES AND EXAMPLES

Example 1 includes subject matter (such as a device, apparatus, or machine) including a wireless communication device (UE) comprising processing circuitry arranged to determine to use an extended paging discontinuous reception (DRX) value to increase a paging cycle length to a value greater than a first value, when the UE is operating in a network in accordance with a standard of a 3rd Generation Partnership Project (3GPP) family of standards for Long Term Evolution (LTE), and a second value, when the UE is operating in a network in accordance with a standard of the Universal Mobile Telecommunications System (UMTS) family of standards. The subject matter may further include physical layer circuitry arranged to transmit a non-access stratum (NAS) message to the network, indicating that the UE desires to use the extended paging DRX value and receive a message from the network that includes an information element (IE) indicating whether the network supports the extended paging DRX value.

In Example 2, the subject matter of Example 1 may optionally include an aspect wherein the NAS message is one of an Attach Request message, a Tracking Area Update Request message, and a Routing Area Update Request message, and the extended paging value is indicated in a DRX Parameter IE.

In Example 3, the subject matter of Example 1 may optionally include an aspect wherein the NAS message is one of an Attach Request message, a Tracking Area Update Request message, and a Routing Area Update Request message, and the extended paging value is indicated in an Extended DRX parameter IE.

In Example 4, the subject matter of Example 1 may optionally include, wherein the physical layer circuitry is further arranged to receive an Extended DRX parameter IE in one of an Attach Accept message, a Tracking Area Update Accept message and a Routing Area Update Accept message.

In Example 5, the subject matter of any one or more of Example 1 to Example 4 may optionally include, wherein the processing circuitry is further arranged to determine a scaling factor by which to multiply the paging cycle length for the UE, wherein the determination is based on one or more of a device type of the UE and a type of one or more applications executing on the UE and the physical layer circuitry is further arranged to transmit the scaling factor to the network in a Device Properties IE.

In example 6, the subject matter of any one or more of Example 1 to 5 may optionally include wherein the scaling factor is received in a system information message.

In Example 7, the subject matter of Example 1 may optionally include, wherein the processing circuitry is further arranged to determine a scaling factor by which to multiply the paging cycle length for the UE, wherein the determination is based on one or more of a device type of the UE and a type of one or more applications executing on the UE and the physical layer circuitry is further arranged to transmit the scaling factor to the network in an Attach Request message and to receive a confirmation message from the network indicating that the scaling factor shall be used by the UE.

Example 8 includes or may optionally be combined with the subject matter of any one of Examples 1-7 to include subject matter (such as a device, apparatus, or machine) including a transceiver arranged to transmit a radio resource control (RRC) signal that includes an information element (IE) indicating whether the subject matter supports user equipment (UE) usage of an extended paging value and receive from a network entity, the extended paging value, responsive to a request from the UE to use the extended paging value.

In Example 9, the subject matter of Example 8 may optionally include, one or more processors arranged to redirect the UE to a neighboring eNodeB that supports usage of the extended paging value upon determining to not support the extended paging value, if the UE is delay tolerant.

In Example 10, the subject matter of Example 8 may optionally include, wherein the transceiver is further arranged to receive a message that indicates a degree to which the UE is delay tolerant and the processor is further arranged to select an extended DRX value from a list of extended DRX values, based on the degree to which the UE is delay tolerant.

In Example 11, the subject matter of Example 8 may optionally include, wherein the transceiver is further arranged to receive a non-access stratum (NAS) message from a UE, the message including a desired scaling factor of the UE, wherein the desired scaling factor is a number by which the UE will multiply a paging cycle value to generate a device-specific paging cycle for the UE and the one or more processors are further arranged to determine whether to permit the UE to use the desired scaling factor, and to configure an RRC Connection Reconfiguration message that includes an indication of whether the UE is permitted to use the desired scaling factor.

In Example 12, the subject matter of Example 8 may optionally include, wherein the apparatus is an evolved NodeB (eNodeB) operating in accordance with a standard of a 3rd Generation Partnership Project (3GPP) family of standards for Long Term Evolution (LTE).

In Example 13, the subject matter of Example 8 may optionally include, wherein the apparatus is a radio network controller (RNC) operating in accordance with a standard of a 3rd Generation Partnership Project (3GPP) family of standards for Universal Mobile Telecommunications System (UMTS).

Example 14 includes or may optionally be combined with the subject matter of any one of Examples 1-13 to include subject matter (such as a method, means for performing acts) comprising determining to use an extended paging discontinuous reception (DRX) value to increase a paging cycle length to a value greater than 256 milliseconds, when the UE is operating in a network in accordance with a standard of a 3rd Generation Partnership Project (3GPP) family of standards for Long Term Evolution (LTE), and 512 milliseconds, when the UE is operating in a network in accordance with a standard of the Universal Mobile Telecommunications System (UMTS) family of standards; transmitting a non-access stratum (NAS) message to the network indicating that the UE desires to use the extended paging DRX value; and receiving a message from the network that includes an information element (IE) indicating whether the network supports the extended paging DRX value.

In Example 15, the subject matter of Example 14 may optionally include an aspect wherein the NAS message is one of an Attach Request message, a Tracking Area Update Request message, and a Routing Area Update Request message, and the extended paging value is indicated in a DRX Parameter IE.

In Example 16, the subject matter of Example 14 may optionally further comprise receiving an Extended DRX parameter IE in an Attach Accept message, a Tracking Area Update Accept message and a Routing Area Update Accept messag.

In Example 17, the subject matter of Example 12 may optionally include determining a scaling factor by which to multiply the paging cycle length for the UE, wherein the determination is based on one or more of a device type of the UE and a type of one or more applications executing on the UE; and transmitting the scaling factor to the network in a Device Properties IE.

In Example 18, the subject matter of Example 14 may optionally include determining a scaling factor by which to multiply the paging cycle length for the UE, wherein the determination is based on one or more of a device type of the UE and a type of one or more applications executing on the UE; transmitting the scaling factor to the network in an Attach Request message; and receiving a confirmation message from the network indicating that the scaling factor shall be used by the UE.

Example 19 includes or may optionally be combined with the subject matter of any one of Examples 1-18 to include subject matter (such as a method, means for performing acts) comprising transmitting a radio resource control (RRC) signal that includes an information element (IE) indicating whether the apparatus supports user equipment (UE) usage of an extended paging value; and receiving from network entity, the extended paging value responsive to a UE request to use the extended paging value.

In Example 20, the subject matter of Example 19 may optionally include redirecting the UE to a neighboring apparatus that supports usage of the extended paging value upon determining to not support the extended paging value, if the UE is delay tolerant.

In Example 21, the subject matter of Example 19 may optionally include receiving a message that indicates a degree to which the UE is delay tolerant; and selecting an extended DRX value from a list of extended DRX values, based on the degree to which the UE is delay tolerant.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an evolved NodeB (eNB) comprising:
memory; and
processing circuitry to:
- decode a request from a user equipment (UE) to use extended idle mode DRX, the request including requested values for extended idle mode DRX parameters;
- encode a system information block (SIB), for transmission to the UE indicating whether the eNB supports extended idle mode DRX;
- provide the request to a Mobility Management Entity (MME) in a non-access stratum (NAS) message;
- decode a response from the MME indicating acceptance of the request; and
- provide paging to the UE according to requested values in accordance with the extended idle mode DRX parameters.

2. The apparatus of claim 1, wherein the MME acceptance includes revised values for the extended idle mode DRX parameters.

3. The apparatus of claim 1, wherein the NAS message includes one of an attach message, a routing area update (RAU) message, and a tracking area update (TAU) message.

4. The apparatus of claim 1, wherein the processing circuitry is configured to:
- direct the UE directed to a different cell if the eNB does not support extended idle mode DRX.

5. A non-transitory computer-readable storage medium that stores instructions for execution by processing circuitry of an evolved NodeB (eNB), the instructions to configure the eNB to:
- decode a request from a user equipment (UE) to use extended idle mode DRX, the request including requested values for extended idle mode DRX parameters;
- encode a system information block (SIB), for transmission to the UE indicating whether the eNB supports extended idle mode DRX;
- provide the request to a Mobility Management Entity (MME) in a non-access stratum (NAS) message;
- decode a response from the MIME indicating acceptance of the request; and
- provide paging to the UE according to requested values in accordance with the extended idle mode DRX parameters.

6. The non-transitory computer-readable storage medium of claim 5, wherein the MME acceptance includes revised values for the extended idle mode DRX parameters.

7. The non-transitory computer-readable storage medium of claim 5, wherein the NAS message includes one of an attach message, a routing area update (RAU) message, and a tracking area update (TAU) message.

8. The non-transitory computer-readable storage medium of claim 5, wherein the processing circuitry is configured to:
- direct the UE directed to a different cell if the eNB does not support extended idle mode DRX.

* * * * *